Patented July 22, 1952

2,604,401

UNITED STATES PATENT OFFICE 2,604,401

METHOD OF ACCELERATING THE GROWTH OF CHICKS

Charles M. Ely, Springdale, Ohio, assignor to National Distillers Products Corp., a corporation of Virginia No Drawing. Application April 26, 1951, Serial No. 223,159

2 Claims. (Cl. 99—4)

This invention is a new and useful method of accelerating the growth of chicks. In the course of numerous experiments I have discovered that the growth of chicks is accelerated by admixing with the total intake either the tri and/or the tetrasodium salt of ethylenediaminetetraacetic acid.

In the course of numerous experiments I have demonstrated that by the addition to the diet of the chicks of fifteen thousandths of 1% of either of the said salts, based on the total amount of solid foods supplied, air dry basis, I am able to accelerate the growth by a minimum of approximately 3%. By the addition of from thirty to ninety thousandths of 1% of either of the said salts, based on the total amount of solids supplied, air dry basis, I am able to accelerate growth approximately 5% or more. The acceleration of growth appears to be sustained up to a maximum of two hundred thousandths of 1% although the optimum efficiency appears to occur within the range of from thirty to ninety thousandths of 1%.

While the amount to be added is predicated on the amount of solid food supplied, air dry basis, the actual introduction may be either in admixture with such foods or in solution in the water supplied to the chicks. The actual food efficiency, i. e., the gain in weight in relation to the total amount of food consumed, does not appear to be effected. The primary advantage is therefore that a greater output is obtainable in unit time from a single installation and since the chicks average larger, the ratio of fatty tissue to bone and offal is greater.

As a specific example a group consisting of 9 female chicks were fed on a ration containing 50 grams for 100 lbs. of solids, air dry basis, of a tetrasodium salt of ethylenediaminetetraacetic acid. This group was compared to a control group of 10 males and 9 females, to the ration of which no addition was made. At the expiration of 70 days the group to the ratio of which the above named salt had been added, showed an increased gain in weight of 5.2% as compared to the control group.

I claim:

1. Method of accelerating the growth of chicks which comprises introducing from fifteen to two hundred thousandths of 1% based on the amount of solid foods, air dry basis, supplied of a salt selected from the tri and tetrasodium salts of ethylenediaminetetraacetic acid.

2. Method of accelerating the growth of chicks which comprises introducing from thirty to ninety thousandths of 1% based on the amount of solid foods, air dry basis, supplied of a salt selected from the tri and tetrasodium salts of ethylenediaminetetraacetic acid.

CHARLES M. ELY.

No references cited.